United States Patent
Hill

(10) Patent No.: US 10,001,833 B2
(45) Date of Patent: *Jun. 19, 2018

(54) USER INPUT SYSTEM FOR IMMERSIVE INTERACTION

(71) Applicant: Position Imaging, Inc., Portsmouth, NH (US)

(72) Inventor: Edward L. Hill, Exeter, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/291,336

(22) Filed: Oct. 12, 2016

(65) Prior Publication Data

US 2017/0031432 A1 Feb. 2, 2017

Related U.S. Application Data

(63) Continuation of application No. 13/967,058, filed on Aug. 14, 2013, now Pat. No. 9,519,344.

(60) Provisional application No. 61/682,787, filed on Aug. 14, 2012.

(51) Int. Cl.
| | |
|---|---|
| *G06F 3/01* | (2006.01) |
| *A63F 13/213* | (2014.01) |
| *A63F 13/23* | (2014.01) |
| *G06F 3/0346* | (2013.01) |
| *G06F 1/16* | (2006.01) |

(52) U.S. Cl.
CPC ............ *G06F 3/011* (2013.01); *A63F 13/213* (2014.09); *A63F 13/23* (2014.09); *G06F 1/1694* (2013.01); *G06F 1/1698* (2013.01); *G06F 3/01* (2013.01); *G06F 3/014* (2013.01); *G06F 3/017* (2013.01); *G06F 3/0346* (2013.01); *A63F 2300/1025* (2013.01); *A63F 2300/1087* (2013.01); *A63F 2300/1093* (2013.01)

(58) Field of Classification Search
USPC ........................................................ 345/156
See application file for complete search history.

(56) References Cited

U.S. PATENT DOCUMENTS

| | | |
|---|---|---|
| 3,824,596 A | 7/1974 | Guion et al. |
| 3,940,700 A | 2/1976 | Fischer |
| 4,328,499 A | 5/1982 | Anderson et al. |
| (Continued) | | |

OTHER PUBLICATIONS

Jianchen Gao, "Development of a Precise GPS/INS/On-Board Vehicle Sensors Integrated Vehicular Positioning System", Jun. 2007, UCGE Reports No. 20555; 245 pages.

(Continued)

*Primary Examiner* — Gustavo Polo
(74) *Attorney, Agent, or Firm* — Lando & Anastasi, LLP

(57) ABSTRACT

A system and method for providing immersive interaction between users and interactive software programs comprise receiving radio frequency (RF) signals, transmitted by an RF-transmitting device, at three or more spatially separated antennas. Time of arrival information is acquired from the RF signals. A position of the RF-transmitting device is computed from the time of arrival information acquired from the RF signals. The position of the RF-transmitting device is registered within a virtual environment produced by an interactive software program (which can execute on a mobile device). The virtual environment, as affected by the registered position of the RF-transmitting device, is transmitted to a display apparatus for display.

14 Claims, 9 Drawing Sheets

(56) References Cited

U.S. PATENT DOCUMENTS

| | | |
|---|---|---|
| 5,010,343 A | 4/1991 | Andersson |
| 5,426,438 A | 6/1995 | Peavey et al. |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,721,657 B2 | 4/2004 | Ford et al. |
| 6,750,816 B1 | 6/2004 | Kunysz |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,190,309 B2 | 3/2007 | Hill |
| 7,193,559 B2 | 3/2007 | Ford et al. |
| 7,236,091 B2 | 6/2007 | Kiang et al. |
| 7,236,092 B1 | 6/2007 | Joy |
| 7,295,925 B2 | 11/2007 | Breed et al. |
| 7,409,290 B2 | 8/2008 | Lin |
| 7,443,342 B2 | 10/2008 | Shirai et al. |
| 7,533,569 B2 | 5/2009 | Sheynblat |
| 7,612,715 B2 | 11/2009 | Macleod |
| 7,646,330 B2 | 1/2010 | Karr |
| 7,876,268 B2 | 1/2011 | Jacobs |
| 8,269,624 B2 | 9/2012 | Chen et al. |
| 8,457,655 B2 | 6/2013 | Zhang et al. |
| 8,749,433 B2 | 6/2014 | Hill |
| 8,957,812 B1 | 2/2015 | Hill et al. |
| 9,482,741 B1 | 11/2016 | Min et al. |
| 9,519,344 B1 | 12/2016 | Hill |
| 2002/0021277 A1 | 2/2002 | Kramer et al. |
| 2003/0053492 A1 | 3/2003 | Matsunaga |
| 2003/0120425 A1 | 6/2003 | Stanley et al. |
| 2003/0195017 A1 | 10/2003 | Chen et al. |
| 2004/0095907 A1 | 5/2004 | Agee et al. |
| 2004/0176102 A1 | 9/2004 | Lawrence et al. |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2007/0060384 A1 | 3/2007 | Dohta |
| 2008/0048913 A1 | 2/2008 | Macias et al. |
| 2008/0204322 A1 | 8/2008 | Oswald et al. |
| 2008/0316324 A1 | 12/2008 | Rofougaran et al. |
| 2009/0149202 A1 | 6/2009 | Hill et al. |
| 2009/0243932 A1 | 10/2009 | Moshfeghi |
| 2010/0103173 A1 | 4/2010 | Lee et al. |
| 2010/0103989 A1 | 4/2010 | Smith et al. |
| 2010/0123664 A1 | 5/2010 | Shin et al. |
| 2011/0006774 A1 | 1/2011 | Baiden |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2012/0013509 A1 | 1/2012 | Wisherd et al. |
| 2012/0127088 A1 | 5/2012 | Pance et al. |
| 2012/0184285 A1 | 7/2012 | Sampath et al. |
| 2013/0021417 A1 | 1/2013 | Ota et al. |
| 2013/0036043 A1 | 2/2013 | Faith |
| 2013/0314210 A1 | 11/2013 | Schoner et al. |
| 2014/0253368 A1 | 9/2014 | Holder |
| 2014/0300516 A1 | 10/2014 | Min et al. |
| 2015/0009949 A1 | 1/2015 | Khoryaev et al. |
| 2015/0091757 A1 | 4/2015 | Shaw et al. |
| 2015/0169916 A1 | 6/2015 | Hill et al. |
| 2015/0323643 A1 | 11/2015 | Hill et al. |
| 2016/0256100 A1 | 9/2016 | Jacofsky et al. |
| 2016/0286508 A1 | 9/2016 | Khoryaev et al. |
| 2016/0371574 A1 | 12/2016 | Nguyen et al. |

OTHER PUBLICATIONS

Yong Yang, "Tightly Coupled MEMS INS/GPS Integration with INS Aided Receiver Tracking Loops", Jun. 2008, UCGE Reports No. 20270; 205 pages.

Debo Sun, "Ultra-Tight GPS/Reduced IMU for Land Vehicle Navigation", Mar. 2010, UCGE Reports No. 20305; 254 pages.

Sun, et al, "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Schmidt & Phillips, "INS/GPS Integration Architectures", NATO RTO Lecture Series, First Presented Oct. 20-21, 2003; 24 pages.

Adrian Schumacher, "Integration of a GPS aised Strapdown Inertial Navigation System for Land Vehicles", Master of Science Thesis, KTH Electrical Engineering, 2006; 67 pages.

Vikas Numar N., "Integration of Inertial Navigation System and Global Positioning System Using Kalman Filtering", M.Tech Dissertation, Indian Institute of Technology, Bombay, Mumbai, Jul. 2004; 69 pages.

Jennifer Denise Gautier, "GPS/INS Generalized Evaluation Tool (GIGET) for the Design and Testing of Intergrated Navigation Systems", Dissertation, Stanford University, Jun. 2003; 160 pages.

Farrell, et al., "Real-Time Differential Carrier Phase GPS=Aided INS", Jul. 2000, IEEE Transactions on Control Systems Technology, vol. 8, No. 4; 13 pages.

Santiago Alban, "Design and Performance of a Robust GPS/INS Attitude System for Automobile Applications", Dissertation, Stanford University, Jun. 2004; 218 pages.

Proakis, John G. and Masoud Salehi, "Communication Systems Engineering", Second Edition, Prentice-Hall, Inc., Upper Saddle River, New Jersey, 2002; 815 pages.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

International Search Report & Written Opinion in international patent application PCT/US12/64860, dated Feb. 28, 2013; 8 pages.

U.S. Appl. No. 13/293,639, filed Nov. 10, 2011, entitled "Position Tracking System and Method Using Radio Signals and Inertial Sensing"; 26 pages.

Notice of Allowance in related U.S. Appl. No. 13/967,058, dated Jul. 25, 2016; 5 pages.

U.S. Appl. No. 13/918,295, filed Jun. 14, 2013, entitled, "RF Tracking with Active Sensory Feedback"; 31 pages.

Non-Final Office Action in related U.S. Appl. No. 13/967,058, dated Jul. 15, 2015; 9 pages.

Non-Final Office Action in related U.S. Appl. No. 13/967,058, dated Dec. 14, 2015; 9 pages.

"ADXL202/ADXL210 Product Sheet," Analog Devices, Inc., Analog.com, 1999; 11 pages.

Yang, Yong, "Tightly Coupled MEMS INS/GPS Integration with INS Aided Receiver Tracking Loops", Jun. 2008, UCGE Reports No. 20270; 205 pages.

Sun, Debo, "Ultra-Tight GPS/Reduced IMU for Land Vehicle Navigation", Mar. 2010, UCGE Reports No. 20305; 254 pages.

Gautier, Jennifer Denise, "GPS/INS Generalized Evaluation Tool (GIGET) for the Design and Testing of Integrated Navigation Systems", Dissertation, Stanford University, Jun. 2003; 160 pages.

(56) References Cited

OTHER PUBLICATIONS

Alban, Santiago, "Design and Performance of a Robust GPS/INS Attitude System for Automobile Applications", Dissertation, Stanford University, Jun. 2004; 218 pages.
"Pourhomayoun, Mohammad and Mark Fowler, ""Improving WLAN-based Indoor Mobile Positioning Using Sparsity,"" Conference Record of the Forty Si Nov. 14, 2016 I DSth Asilomar Conference on Signals, Systems and Computers, Nov. 4-7, 2012, pp. 1393-1396, Pacific Grove, California."
Schmidt & Phillips, "INS/GPS Integration Architectures", NATO RTO Lecture Seriers, First Presented Oct. 20-21, 2003; 24 pages.
Grewal & Andrews, "Global Positioning Systems, Inertial Nagivation, and Integration", 2001, John Weiley and Sons, pp. 252-256.
Goodall, Christopher L., "Improving Usability of Low-Cost INS/GPS Navigation Systems using Intelligent Techniques", Jan. 2009, UCGE Reports No. 20276; 234 pages.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.
Vikas Kumar N., "Integration of Inertial Navigation System and Global Positioning System Using Kalman Filtering", M. Tech Dissertation, Indian Institute of Technology, Bombay, Mumbai, Jul. 2004; 69 pages.
Filho, et al., "Integrated GPS/INS Navigation System Based on a Gyrpscope-Free IMU", DINCON Brazilian Conference on Synamics, Control, and Their Applications, May 22-26, 2006; 6 pages.
U.S. Appl. No. 13/975,724, filed Aug. 26, 2013, entitled, "Radio Frequency Communication System" 22 pages.
"ADXL/ADXL210 Product Sheet", Analog Devices, Inc., Analog.com, 1999; 11 pages.
"Real-time differential Carrier Phase GPS-Aided INS," Jay Farrell, tony Givargis, Matthew Barth, IEEE Transactions on control Systems Technology, vol. 8, No. 4, Jul. 2000, 13 pages.
"Development of a Precise GPS/INS/On-Board Vehicle Sensors Integrated Vehicular Positioning System," Jianchen Gao, UCGE Reports No. 20255, Jun. 2007, 245 pages.
Integration of a GPS aided Strapdown Inertial Navigation System for Land Vehicles, Adrian Schumacher, KTH Electrical Engineering, XR-EE-SB 2006:006, 67 pages.

USER INPUT SYSTEM FOR IMMERSIVE INTERACTION

RELATED APPLICATIONS

This application is a continuation application of U.S. patent application Ser. No. 13/967,058, filed Aug. 14, 2013, titled "User Input System for Immersive Interaction", which claims the benefit of and priority to U.S. provisional application No. 61/682,787, filed Aug. 14, 2012, titled "New User Input System for Immersive Interaction," the entireties of which are incorporated by reference herein.

FIELD OF THE INVENTION

The invention relates generally to systems and methods for human-computer interaction. More particularly, the invention relates to a user input system for immersive human-computer interaction.

BACKGROUND

Much investment has gone toward improving the immersive experience in human-computer interaction. Many industries, such as medicine, architecture, aeronautics, teaching, and manufacturing, have benefited from immersive interactive technologies. Game immersive interaction is a widely publicized market because of its size and of the relative value of improving the users' experience during game-play. This improved experience relates directly to how realistic, how lifelike the game feels to a player. One of the keys to providing this lifelike sense of reality within a game is to register a user's physical world within the digital world created by the computer game system.

Today, the principal technologies involved in registering a user's physical world with a game's computer world have been infrared (IR), inertial, and camera gesture tracking. Each technology adds a different level of interaction and experience for games. Inertial and camera gesture tracking allow a game to sense a user's motion and IR tracking provides some two dimensional pointing functionality for fine-tuning an inertial tracking system. However, each of these technologies has limitations. All camera and IR systems are limited to line-of-sight with the user or user's game controller, and working volumes are restricted by angle of view restrictions and poor depth sensing. Inertial technologies, like those used by gyroscopes, accelerometers, and magnetometers, track motion, not position. For the most part, these technologies focus on improving the gaming consoles made specifically for games that have very large processing power and speed requirements.

A new phenomenon, mobile gaming, has arisen from the enormous success of smart phones and tablets. Users can now download and play games directly on a smart phone or tablet's touch-screen without cost or for a small investment compared to the relatively high cost of console game software. The advance of technology has led to smart phones (a mobile phone built on a mobile operating system, having computing and networking capability) and tablets (mobile computer) with increasingly powerful processing that enable them to operate games directly, without requiring an external game console. In addition, requirements for software developers to produce games for mobile devices have become less restrictive than producing such games for game consoles. These market forces have allowed mobile gaming to become as large as the console gaming market and mobile gaming is likely to surpass console gaming in the near future.

Despite the growing success of mobile games, these games suffer from limited user interface options imposed by a simple and small two-dimensional touch screen. Many mobile games are played by touching a display screen and by using the point of touch as the input point for navigating and controlling the game. Playing games on a small touch screen, with the touch screen as the only input option, produces a limited immersive experience compared to playing on a large television screen. These interface and hardware realities inherently limit a mobile device's level of immersive interaction.

SUMMARY

In one aspect, the invention features a position tracking system for providing immersive interaction between users and interactive software programs. The position tracking system comprises a network of three or more spatially separated antennas fixed at different locations. The three or more antennas receive radio signals sent from an RF-transmitting device. A user input system is in communication with the network of antennas, to acquire therefrom time of arrival information of the radio signals received by each of the antennas. The user input system includes a first interface in communication with an interactive software program that produces a virtual environment and a second interface in communication with a device having a display screen on which the virtual environment produced by the interactive software program is displayed. The user input system further includes a processor programmed to calculate a position of the RF-transmitting device from the time of arrival information acquired from each of the antennas and to register the position of the RF-transmitting device within the virtual environment produced by the interactive software program and displayed on the display screen.

In another aspect, the invention features a method for providing immersive interaction between users and interactive software programs. The method comprises receiving radio frequency (RF) signals, transmitted by an RF-transmitting device, at three or more spatially separated antennas. Time of arrival information is acquired from the RF signals. A position of the RF-transmitting device is computed from the time of arrival information acquired from the RF signals. The position of the RF-transmitting device is registered within a virtual environment produced by an interactive software program. The virtual environment, as affected by the registered position of the RF-transmitting device, is transmitted to a display apparatus for display.

In still another aspect, the invention features a computer program product for providing immersive interaction between users and interactive software programs. The computer program product comprises a computer readable storage medium having computer readable program code embodied therewith. The computer readable program code comprises computer readable program code that, if executed, processes radio frequency (RF) signals transmitted by an RF-transmitting device and received by three or more spatially separated antennas, computer readable program code that, if executed, acquires time of arrival information from the RF signals, computer readable program code that, if executed, computes a position of the RF-transmitting device from the time of arrival information acquired from the RF signals, computer readable program code that, if executed, registers the position of the RF-transmitting device within a virtual environment produced by an interactive software program, and computer readable program code that, if executed, transmits the virtual environment, as affected by the registered position of the RF-transmitting device, to a display apparatus for display.

The computer program product can further comprise any one or more of the following, alone or in combination: the interactive software program that, if executed, produces the virtual environment; computer readable program code that, if executed, communicates wirelessly with a mobile device running the interactive software program, to receive the virtual environment as affected by the registered position; computer readable program code that, if executed, communicates over a Universal Serial Bus (USB) connection to a mobile device running the interactive software program, to receive the virtual environment as affected by the registered position; computer readable program code that, if executed, communicates wirelessly with the antennas; and computer readable program code that, if executed, transmits the virtual environment, as affected by the registered position of the RF-transmitting device, to the display apparatus for display over an HDMI connection.

DETAILED DESCRIPTION

Figure 1:
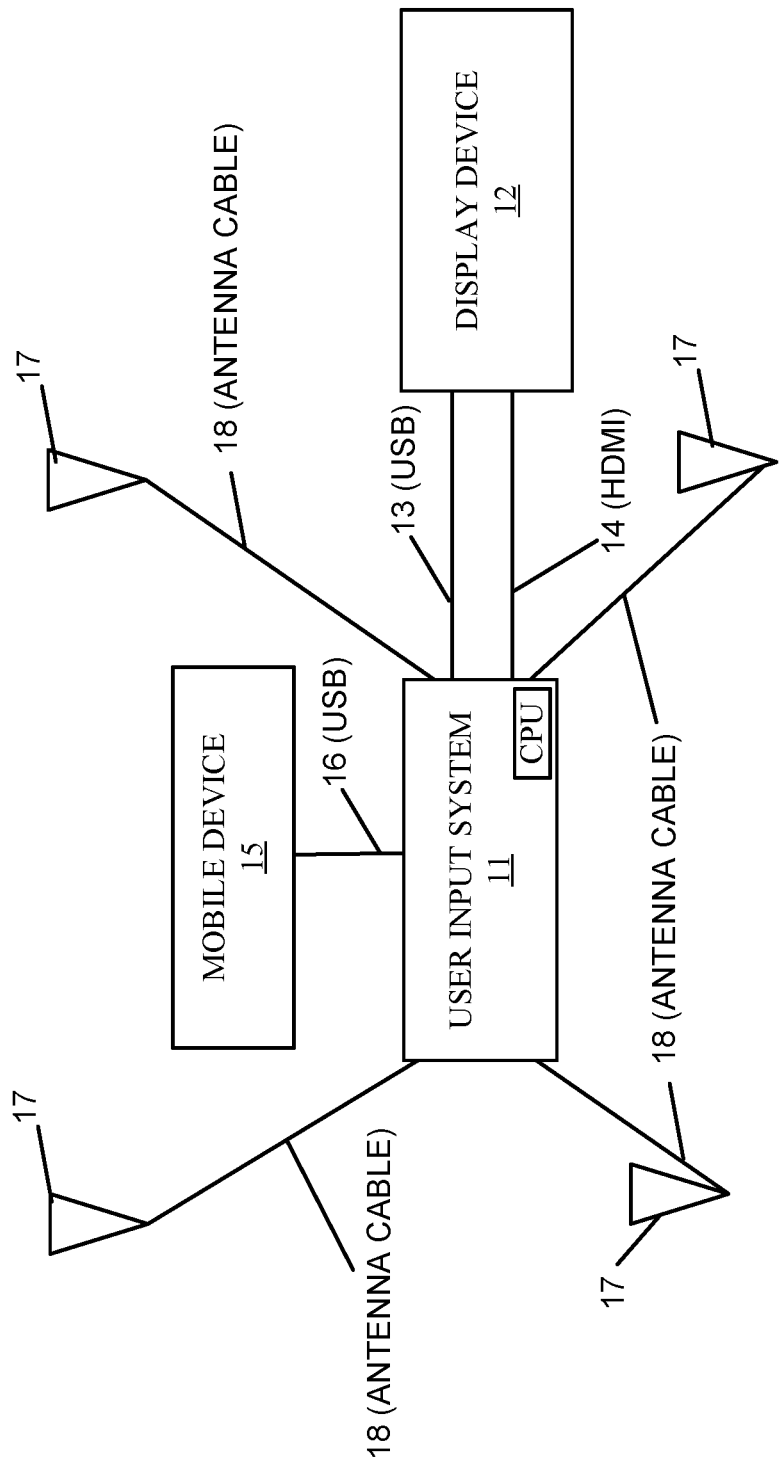
FIG. 1 is a block diagram of an embodiment of a user input system.

User input systems described herein combine a method of registering a user's physical world with the digital environment with an embodiment that allows users to play the games, typically played directly on their mobile devices, on their televisions or PC monitors.

Radio frequency (RF)-based position tracking can solve several limitations of camera and infrared optical tracking systems, such as line-of-sight and small working volumes. RF position tracking can also solve the problem of position drift experienced by inertial systems. In addition, inertial systems can be used to determine the orientation of the RF-transmitting device. Such orientation information can be used to complement the position tracking. Integral to the user input systems described herein, an RF position tracking system that can accurately register the physical position of an RF-transmitting device (e.g. game or TV controller) to control software programs that normally use mouse, touch, or similar two dimensional navigation input methodologies. In general, the RF-transmitting device is a peripheral, human interface device that can be held, grasped, worn by, attached to, or placed on the user and is typically powered by a self-contained power source. The RF-transmitting device includes two functions: a transmitter function for transmitting radio signals needed to track the position of the RF-transmitting device, and an input function for providing data and/or control signals (e.g., spatial data).

By using the processing power of a mobile device (e.g., tablet, smart phone, laptop computer) to operate the software program, the described user input systems can reduce cost and complexity. Through wired (or wireless) connectivity to the user's TV, a user input system provides a new way of playing video games through improved free space registration of the RF-transmitting device and allows users to play these less expensive and/or free mobile games directly on their TV screen or PC monitor. Users are also able to download other application software (applications) for their mobile devices (smart phone, tablet, etc.), and be able to view their new applications on their TV's (or PC monitors, etc.), and to navigate and interact with them through a game controller, TV remote, etc. (i.e., the RF-transmitting device).

In brief overview, each embodiment of a user input system (for televisions and other electronic monitors) tracks the position in free space of one or more RF-transmitting devices (such as a television remote controller) and uses the position of each RF-transmitting device to navigate and interface with software programs (such as video games) being run on a mobile touch screen or similar mobile device, or by the user input system itself. The user input system is equipped to connect to a television for power (via USB or similar connection), and for imaging transfer (via High Definition Multimedia Interface (HDMI) or similar connection) for viewing images produced by interactive software running on the mobile device.

In such a user input system, the input interface uses wireless radio signals received at multiple passive antennas in different locations, connected to the user input system, to make received signal timing measurements sent from the RF-transmitting device being tracked, and uses that timing data to make positioning calculations using triangulation or trilateration techniques. To calculate the position of the RF-transmitting device, the user input system can use techniques described in U.S. patent application Ser. No. 13/079,800, filed Apr. 4, 2011, titled "Multiplexing Receiver System", and in U.S. patent application Ser. No. 13/918,295, filed Jun. 4, 2013, titled "RF Tracking with Active Sensory Feedback", the entireties of which applications are incorporated by reference herein.

As the RF-transmitting device moves in free space, the user input system tracks its position and uses its position to navigate within a computer program via a mouse, Human Input Device (HID), or similar input device protocol. Tracking the position (as opposed to the motion) of the RF-transmitting device, the user input system can provide a more realistic and intuitive human-computer interactive interface. By providing means to run software, through either an internal operating system contained within the user input system, or by interfacing with an external mobile device such as a smart phone or a tablet, with a set-top box, or with a display device such as a TV, that is operating the software, the user input system can provide a cost effective approach for applications that utilize mobile devices for user interfaces during human-computer interaction.

FIG. 1 shows an embodiment of a user input system 11 in communication with a television (TV) 12 by a USB connection 13 to provide power to the user input system 11. An HDMI connection 14 is also used to transfer the image that is displayed from an external mobile device, in this embodiment a tablet 15, which is operating the interactive software program used in this example. The tablet 15 in this example is connected through a different USB connection 16 to the user input system 11 to allow the user input system 11 to utilize the operating system and processing power of the tablet 15 and/or to provide power to the tablet 15 directly from the user input system 11. In this embodiment, the user input system 11 incorporates four antennas 17, which are connected to the user input system 11 using coaxial or similar cables 18.

During operation, the user input system 11 receives the radio signals from an RF-transmitting device (ref no. 22 in FIG. 2), such as a remote controller, and, by calculating the time of arrival information from the RF-transmitting device's RF signals received at each antenna 17, determines the position (two or three dimensional) of the RF-transmitting device in free space. The user input system 11 translates (or converts) this absolute position information of the RF-transmitting device into relative cursor movement information. The user input system 11 then sends this relative cursor movement information to the tablet 15, where the relative cursor movement information is used as interactive input, like a mouse input, to navigate within and to control the interactive application program being run by the tablet 15. As the interactive application program is running in the tablet 15, the image from the tablet 15 is sent to the user input system 11 through the USB connection 16 and, then, from the user input system 11 to the TV 12 through the HDMI 14 connection. In this example embodiment, the tablet 15 utilizes its own program operating system, thereby reducing costs and enabling the user input system 11 to limit its operations to position tracking of the RF-transmitting device, data communication, and position input translation/conversion via Human Interface Device or similar user input device protocols. In other embodiments, the user input system 11, the TV 12, or a set-top box in communication with the TV, can run the interactive application program.

Figure 2:
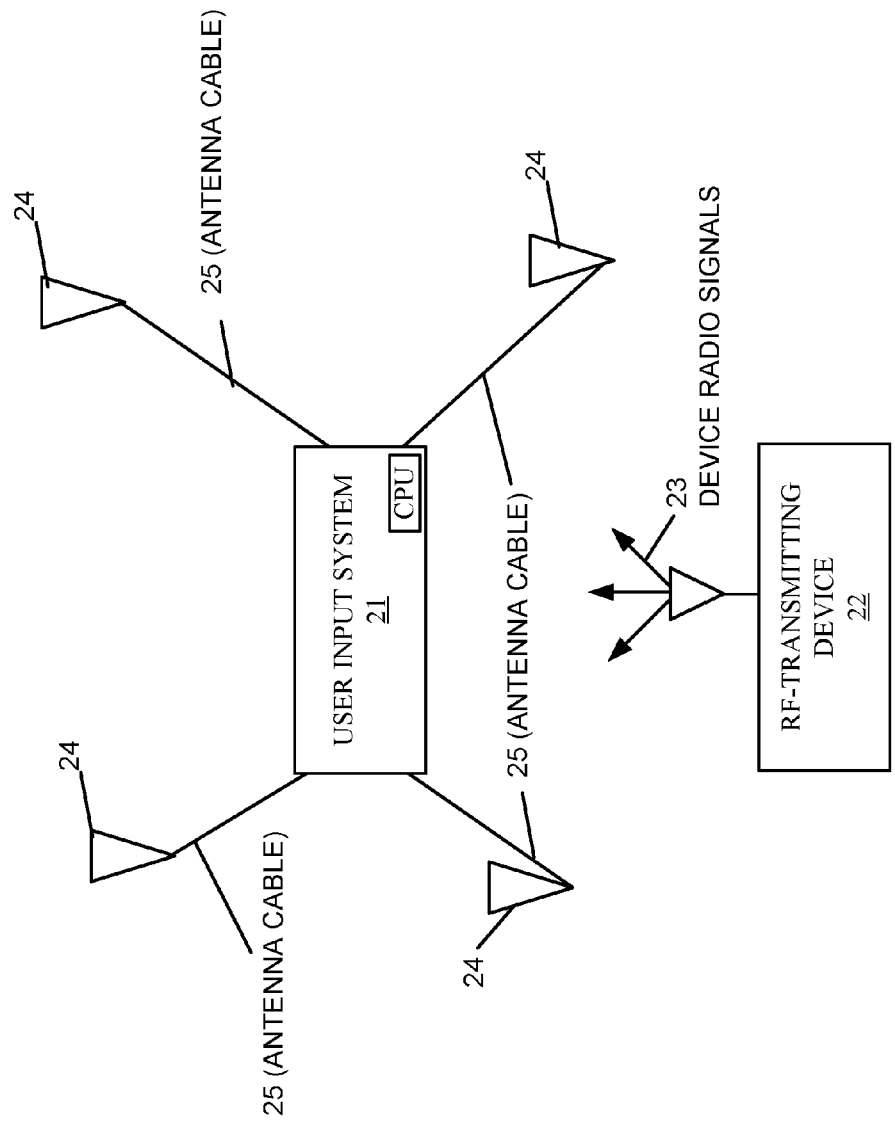
FIG. 2 is a block diagram of an embodiment of the user input system configured to track the position of an RF-transmitting device.

FIG. 2 shows an embodiment of a user input system 21 configured to track the position of an RF-transmitting device 22 by using the radio signals 23 sent by the RF-transmitting device 22. These signals are received at each of four antennas 24 connected to the user input system 21 by cables 25. Because each antenna 24 is located in a different position, the time of arrival of the radio signals 23 from the RF-transmitting device 22 are calculated and compared, using each location of each antenna 24 as the basis for triangulation or trilateration calculations. The user input system 21 then sends the position of the RF-transmitting device 22 to an external mobile device (not shown) for position registration for program navigation and operation.

Figure 3:
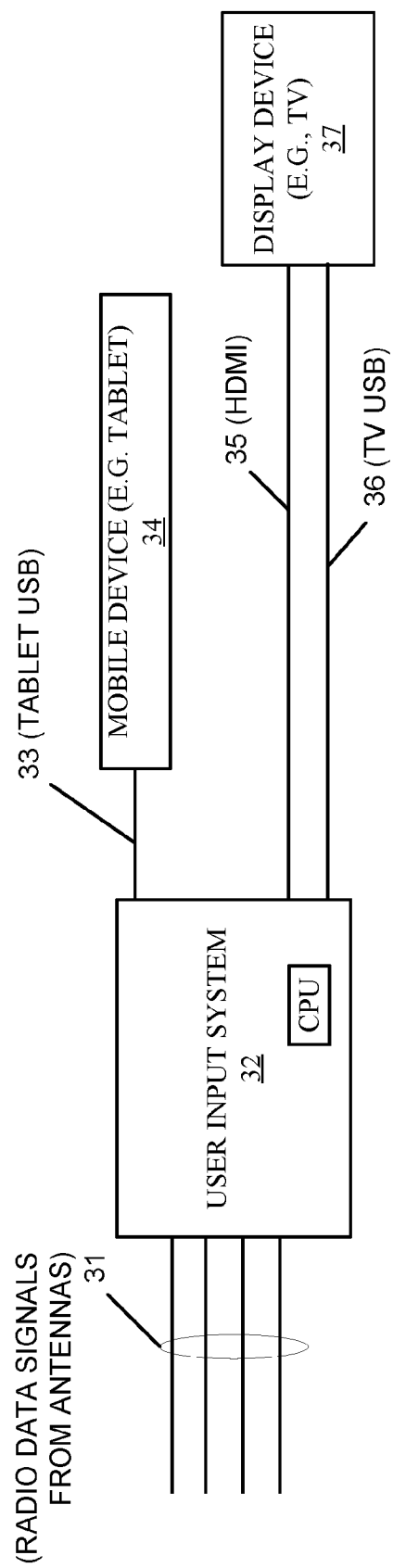
FIG. 3 is a block diagram of an embodiment of a communication interface of the user input system.

FIG. 3 illustrates an embodiment of a process for registering the position of an RF-transmitting device within an application program running on an external mobile device. In this process, data 31 from the radio signals received at each of four antennas are transmitted to the user input system 32. The user input system 32 records the time of arrival information at each antenna and uses the time of arrival difference to calculate the position of the RF-transmitting device. In addition, the position is converted at the user input system 32 into a protocol that can be used by the tablet 34 for navigating the program that is being operated on the tablet 34. In our example embodiment, the user input system 32 uses the HID protocol and sends this data through a USB connection (33) to the tablet 34. The audio and video produced by the application program running in the tablet 34 (but controlled by the position of the RF-transmitting device determined in the user input system 32) are then transferred from the tablet 34 to the user input system 32 through the USB connection 33. The user input system 32 sends the audio and video to the TV 37 through the HDMI connection 35. In this embodiment, the user input system 32 uses the USB connection 36 from the TV 37 to power the operation of the user input system 32, thus enabling the user input system 32 to eliminate the need for an external power source beyond the USB connection 36 from the TV 37.

Figure 4:
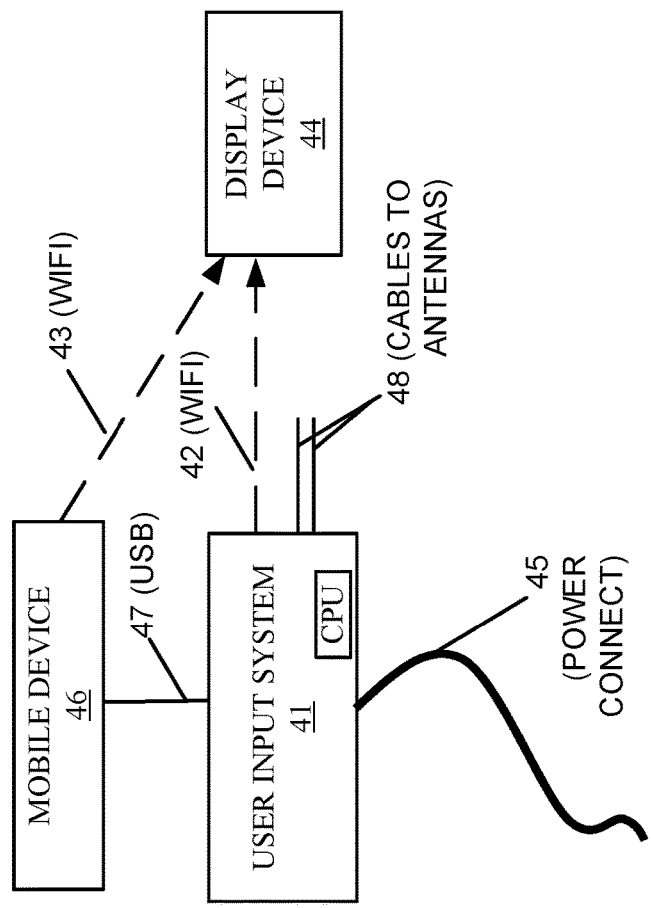
FIG. 4 is a block diagram illustrating a wireless communication link to a television (TV).

FIG. 4 shows another embodiment of a user input system 41 configured with wireless connectivity 42 to a TV 44. In this embodiment, the user input system 41 performs the position tracking function of an input device and sends position data to a tablet 46 (an example of an external mobile device) through a USB connection 47, for navigating and controlling the application program being operated on the tablet 46. The image from the tablet 46 can then be sent back to the user input system 41 for wireless transmission to the TV 44 via a WiFi or similar wireless protocol 42. Alternatively, the tablet 46 can be used to send the program image wirelessly to the TV 44 using a WiFi or similar wireless protocol 43. In both embodiments, the user input system 41 is connected to the antennas 48 by a coaxial or similar cable and is powered by a standard power connection 45. Alternatively, the tablet 46 can draw power from the user input system 41 directly through the USB connection 47 and not require the power connection 45.

Figure 5:
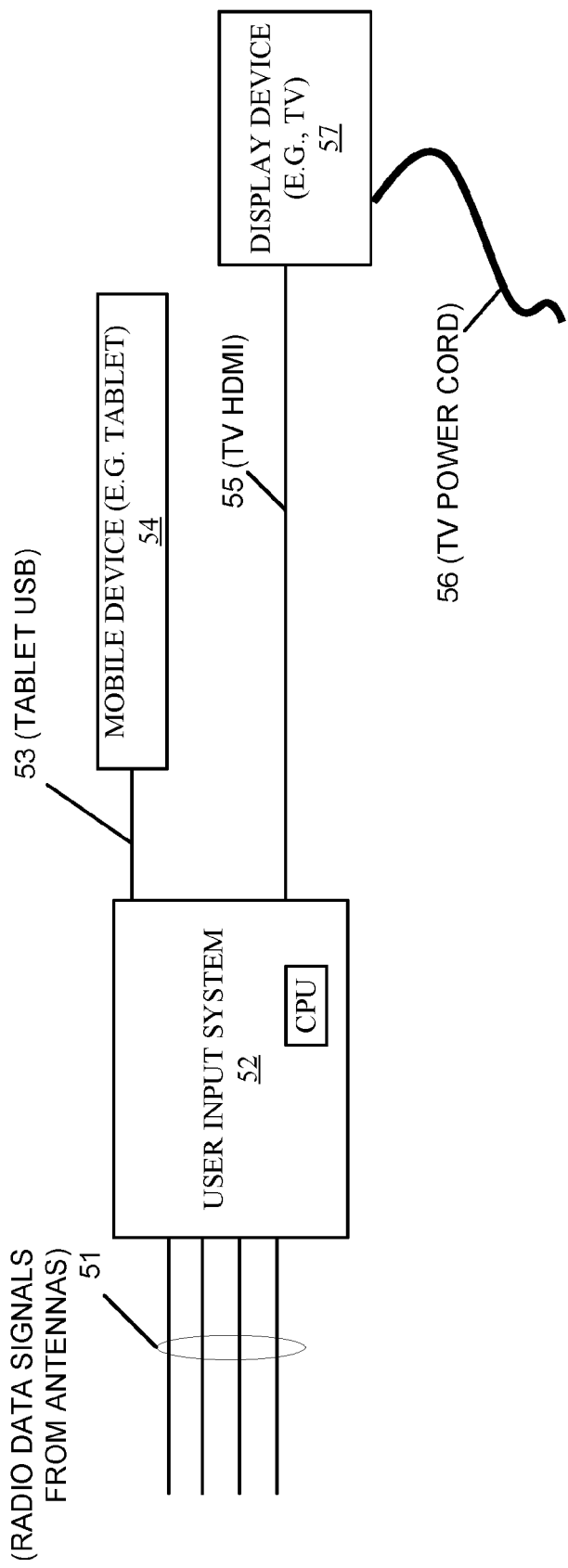
FIG. 5 is a block diagram illustrating the user input system with a standard power connection for power.

FIG. 5 shows an embodiment of a process for registering the position of an RF-transmitting device within an application program running on an external mobile device. In this embodiment, the data 51 in the radio signals received at each of the four antennas are sent to the user input system 52, where their time of arrival information at each antenna is recorded and used by the user input system 52 to determine the position of the RF-transmitting device. The position of the RF-transmitting device is calculated by the user input system 52 and is converted at the user input system 52 into a protocol that can be used by the tablet 54 for navigating the program that is being operated on the tablet 54. In this embodiment, the user input system 52 uses the HID protocol and sends this data through a USB connection 53 to the tablet 54. The software program running in the tablet 54 but controlled by the position of the RF-transmitting device determined in the user input system 52 is then transferred through from the tablet 54 to the user input system 52 through the USB connection 53 and then sent by the user input system 52 to the TV 57 through the HDMI connection 55.

Figure 6:
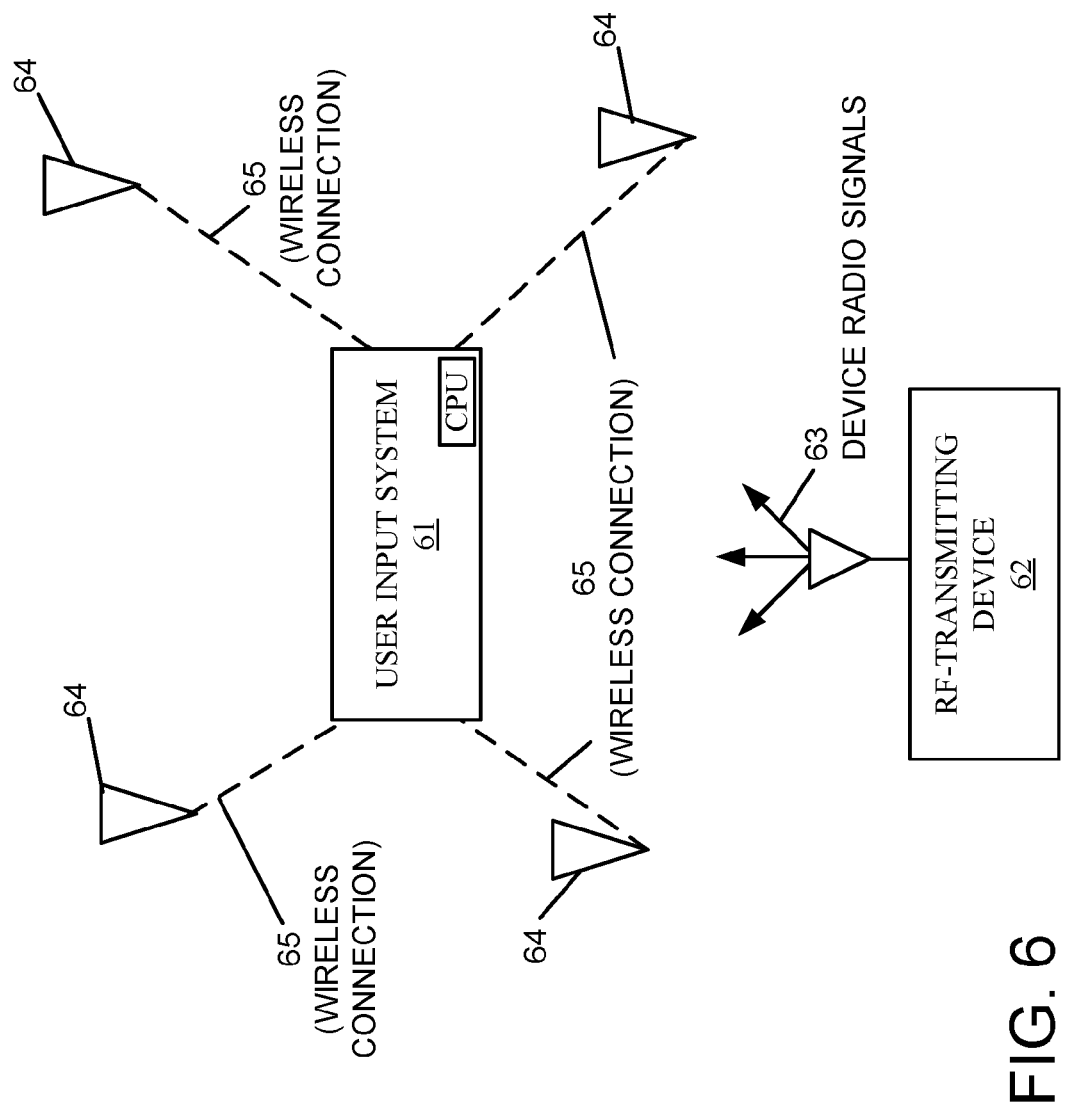
FIG. 6 is a block diagram showing the user input system using a wireless connection to antennas.

FIG. 6 shows an embodiment of a user input system 61 that tracks the position of an RF-transmitting device 62 by using the radio signals 63 sent by the RF-transmitting device 62 as they are received at each of the four antennas 64. Each of the four antennas 64 is connected to the user input system 61 through a wireless connection 65. Because each antenna 64 is located at a different position, the time of arrival of the radio signals 63 can be calculated and compared using each location as the basis for triangulation or trilateration calculations. The user input system 61 then sends the position of the RF-transmitting device 62 to an external mobile device (e.g., a smart phone, tablet, etc.), for position registration for program navigation and operation.

Figure 7:
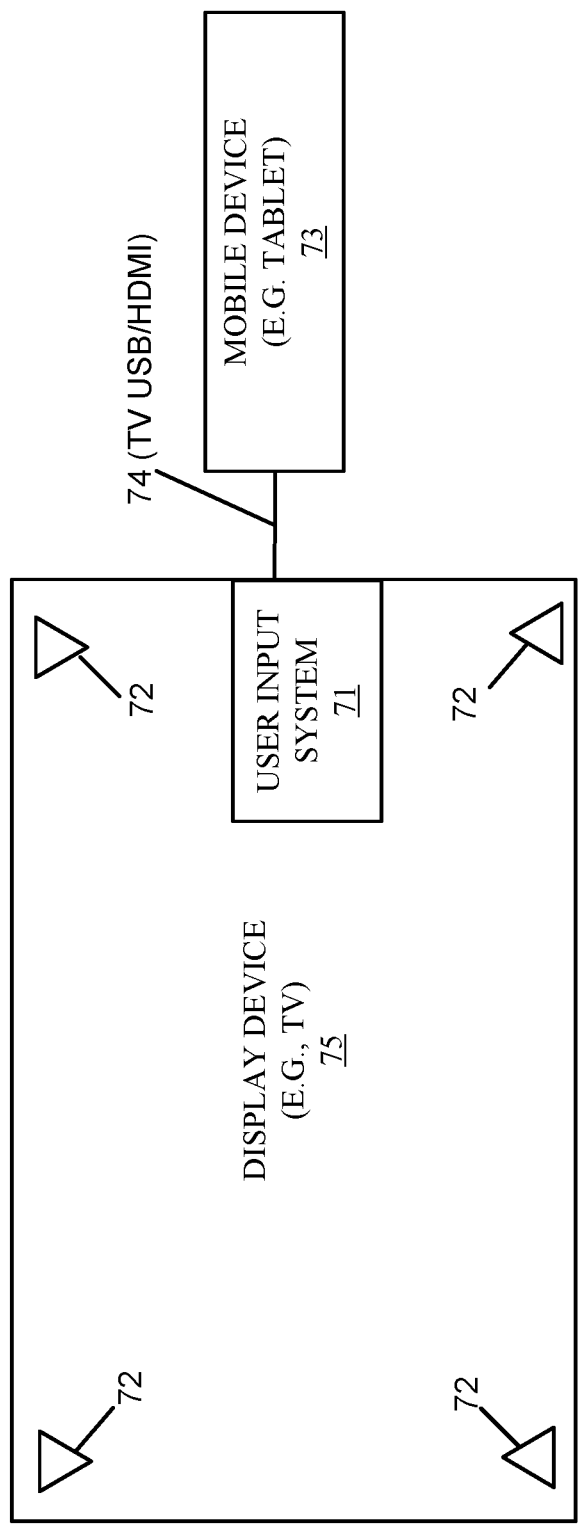
FIG. 7 is a block diagram showing the user input system as embedded in a TV.

FIG. 7 shows an embodiment of the user input system 71 integrated into a TV (75). In this example, the user input system 71, including antennas 72, is embedded into the TV 75. In this embodiment, a Tablet 73 is operating the software programs and interfacing with the user input system 71 through a standard HDMI and/or a USB connection 74. In a similar embodiment, the user input system 71 can also be integrated into a computer/computer monitor, or similar computer with view screen or without a monitor.

Figure 8:
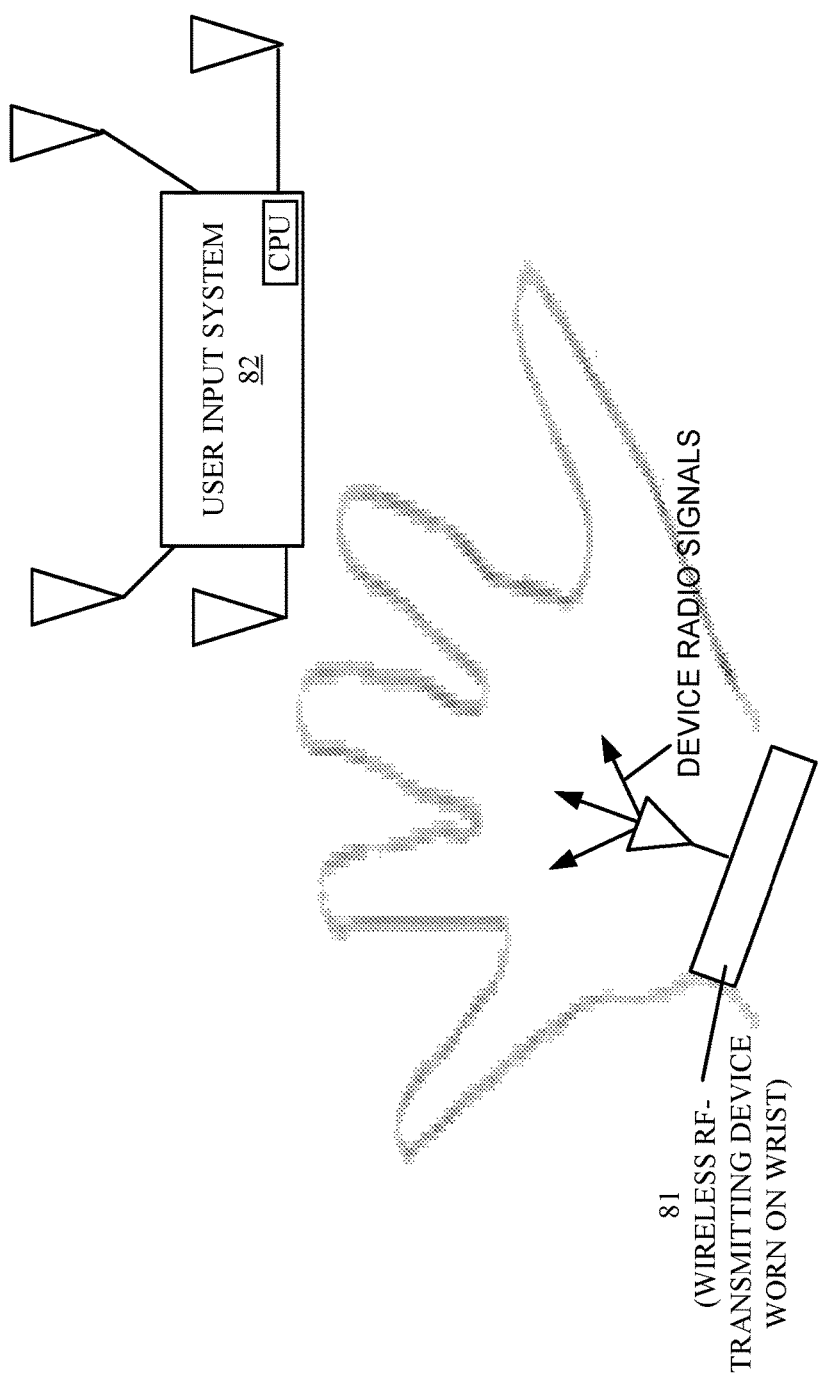
FIG. 8 is a diagram of an embodiment of a wearable RF-transmitting device.

FIG. 8 shows an embodiment of a wearable wireless RF-transmitting device 81 tracked by a user input system 82. In this embodiment, the user wears the RF-transmitting device 81 on a wrist (rather than handheld). Wearing the RF-transmitting device 81 allows the user to use his or her hands and fingers for other activities, but still provides position tracking of the hand for interaction with the user input system 82. In other embodiments, a user can wear or hold multiple RF-transmitting devices 81 to provide an extensive kinematic tracking.

Figure 9:
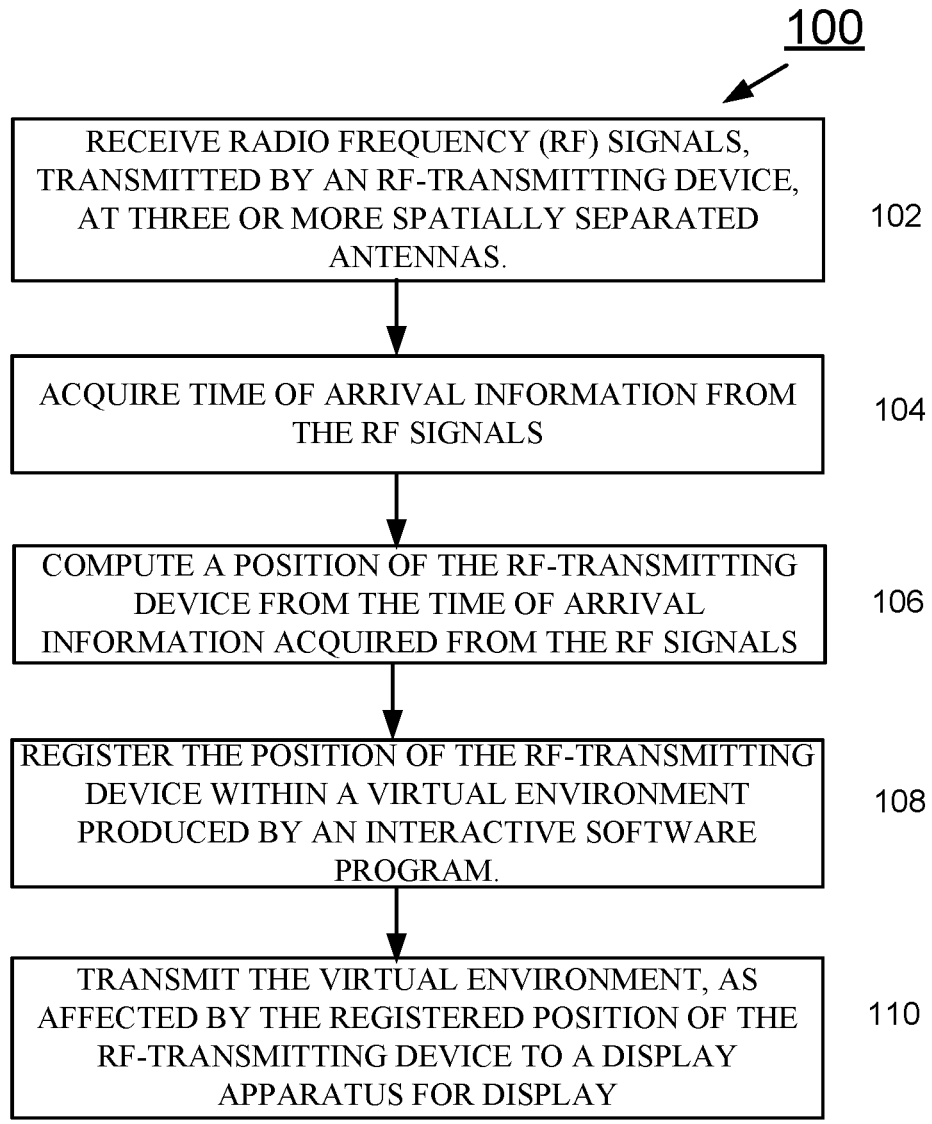
FIG. 9 is a flow diagram of an embodiment of a process for providing immersive interaction between users and interactive software programs.

FIG. 9 shows an embodiment of a process 100 for providing immersive interaction between users and interactive software programs. The process 100 includes receiving (step 102) radio frequency (RF) signals, transmitted by an RF-transmitting device, at three or more spatially separated antennas. Time of arrival information is acquired (step 104) from the RF signals. A position of the RF-transmitting device is computed (step 106) from the time of arrival information acquired from the RF signals. The position of the RF-transmitting device is registered (step 108) within a virtual environment produced by an interactive software program. The virtual environment, as affected by the registered position of the RF-transmitting device, is transmitted (step 110) to a display apparatus for display.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote device or entirely on a remote device. Any such remote device may be connected to the user's device through any type of network, including a local area network (LAN) or a wide area network (WAN), or the connection may be made to an external device (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer arts.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A user input system comprising:
   an input interface connected to three or more spatially separated antennas to acquire therefrom radio signals transmitted by an RF-transmitting device operated by a user;
   a first interface in wireless communication with a mobile device executing at least a portion of an interactive software program on the mobile device that, when executed, displays a virtual environment on a display screen;
   a second interface in communication with the display screen; and
   a processor programmed to calculate a position of the RF-transmitting device from timing information determined from the radio signals received through the input interface and to register the position of the RF-transmitting device within the interactive software program as user input by which the user interacts with and navigates the virtual environment displayed by the interactive software program on the display screen, wherein the first interface is configured to receive the virtual environment, as affected by the registered position of the RF-transmitting device, from the mobile device, and wherein the second interface is configured to transmit the virtual environment, as affected by the registered position of the RF-transmitting device, to a device having the display screen after the virtual environment, as affected by the registered position of the RF-transmitting device, has been received from the mobile device by the first interface.

2. The user input system of claim 1, wherein the processor is further programmed to run at least a portion of the interactive software program.

3. The user input system of claim 1, wherein the mobile device comprises the RF-transmitting device whose position is calculated and registered.

4. The user input system of claim 1, wherein the processor is further programmed to determine an orientation of the mobile device from inertial data included in the radio signals transmitted by the RF-transmitting device.

5. The user input system of claim 1, wherein the input interface is in wireless communication with the three or more spatially separated antennas.

6. The user input system of claim 1, wherein the second interface comprises a USB connection to the device having the display screen through which the user input system receives power.

7. The user input system of claim 1, wherein the second interface comprises a High Definition Multimedia Interface (HDMI) connection to the device having the display screen through which the user input system sends the virtual environment as affected by the registered position of the RF-transmitting device.

8. A method for providing immersive interaction between users and interactive software programs, the method comprising:
   acquiring timing information associated with radio signals transmitted by an RF-transmitting device operated by a user and received by at least three spatially separated antennas;
   computing a position of the RF-transmitting device from the timing information associated with the radio signals received by the at least three antennas;
   executing at least a portion of an interactive software program on a mobile device to provide a virtual environment;
   registering the computed position of the RF-transmitting device within the virtual environment of the interactive software program as user input by which the user interacts with and navigates the virtual environment produced by the interactive software program;
   receiving a signal representing the virtual environment, as affected by the registered position of the RF-transmitting device, over a wireless communication link from the mobile device executing the interactive software program; and
   transmitting the virtual environment, as affected by the registered position of the RF-transmitting device, to a device having a display screen for display of the virtual environment and the RF transmitting device within the virtual environment after receiving the virtual environment, as affected by the registered position of the RF-transmitting device, from the mobile device.

9. The method of claim 8, wherein transmitting the virtual environment, as affected by the registered position of the RF-transmitting device, to the device with the display screen occurs over an HDMI connection.

10. The method of claim 8, further comprising determining an orientation of the mobile device that comprises the RF-transmitting device from inertial data included in the radio signals transmitted by the RF-transmitting device.

11. A display device comprising:
   a unit with a display screen;
   three or more spatially separated antennas coupled fixedly at different locations to the unit, the three or more antennas receiving radio signals sent from an RF-transmitting device operated by a user to interact with an interactive software program executing at least in part on a mobile device that produces a virtual environment; and
   a user input system in communication with the antennas to acquire therefrom timing information associated with the radio signals sent from the RF-transmitting device and received by each of the antennas, the user input system including a processor programmed to calculate a position of the RF-transmitting device from the timing information associated with the radio signals received by each of the antennas and to register the position of the RF-transmitting device within the interactive software program as user input by which the user interacts with and navigates within the virtual environment to be displayed on the display screen, the user input system further including a first interface in wireless communication with the interactive software program executing at least in part on the mobile device and configured to receive the virtual environment, as affected by the registered position of the RF-transmitting device, from the mobile device, and a second interface in communication with the display screen and configured to transmit the virtual environment, as affected by the registered position of the RF-transmitting device, to the display screen after the virtual environment, as affected by the registered position of the RF-transmitting device, has been received from the mobile device via the first interface.

12. The display device of claim 11, wherein the processor of the user input system is further programmed to run at least in part the interactive software program.

13. The display device of claim 11, wherein the user input system is in wireless communication with the three or more spatially separated antennas.

14. The display device of claim 11, wherein the first interface of the user input system is in wireless communication with the mobile device that comprises the RF-transmitting device whose position is calculated and registered within the interactive software program that produces the virtual environment to be displayed on the display screen.

* * * * *